(12) United States Patent
Bertino et al.

(10) Patent No.: US 12,291,621 B2
(45) Date of Patent: May 6, 2025

(54) FABRICATION OF AEROGELS AND AEROGEL COMPOSITES BY AMBIENT PRESSURE SUBLIMATION OF FROZEN SOLVENTS

(71) Applicant: VIRGINIA COMMONWEALTH UNIVERSITY, Richmond, VA (US)

(72) Inventors: Massimo Bertino, Glen Allen, VA (US); Tyler Selden, Richmond, VA (US)

(73) Assignee: Virginia Commonwealth University, Richmond, VA (US)

(*) Notice: Subject to any disclaimer, the term of this patent is extended or adjusted under 35 U.S.C. 154(b) by 702 days.

(21) Appl. No.: 17/621,278

(22) PCT Filed: Jun. 25, 2020

(86) PCT No.: PCT/US2020/039485
§ 371 (c)(1),
(2) Date: Dec. 21, 2021

(87) PCT Pub. No.: WO2020/264070
PCT Pub. Date: Dec. 30, 2020

(65) Prior Publication Data
US 2022/0356320 A1    Nov. 10, 2022

Related U.S. Application Data

(60) Provisional application No. 62/868,228, filed on Jun. 28, 2019.

(51) Int. Cl.
*C08J 9/28*    (2006.01)

(52) U.S. Cl.
CPC .......... *C08J 9/28* (2013.01); *C08J 2201/0484* (2013.01); *C08J 2205/026* (2013.01); *C08J 2205/06* (2013.01)

(58) Field of Classification Search
CPC ................. C08J 9/28; C08J 2201/0484; C08J 2205/026; C08J 2205/06; C08J 2201/0482; C08J 2201/0543; C08J 2201/0546; C08J 2361/10; C08J 2383/04; C01B 33/1585; B32B 5/24
See application file for complete search history.

(56) References Cited

U.S. PATENT DOCUMENTS

2018/0251377 A1    9/2018 Derby et al.
2019/0062517 A1 *  2/2019 Steiner, III ................. C08J 9/28

FOREIGN PATENT DOCUMENTS

WO    WO-2017060719 A1 *  4/2017    .......... B01J 13/0091
WO       2017/127828 A1    7/2017
WO    WO-2017185009 A1 * 10/2017    .......... B01J 13/0091

* cited by examiner

Primary Examiner — K. Boyle
(74) Attorney, Agent, or Firm — WCF IP

(57) ABSTRACT

Drying polar solvents which do not form hydrogen bonds with a wet gel or aerogel, or eutectics or solvent mixtures with the drying solvents, are utilized in a solvent exchange with wet gels used in the formation of aerogels. Preferably the drying solvents are non-polar solvents. The drying solvent or solvent mixtures results in profoundly less shrinkage, thereby allowing for the production of aerogels of preferred materials properties.

19 Claims, 1 Drawing Sheet

10    PREPARARE WET GEL

12    SOLVENT EXCHANGE WITH NON-POLAR SOLVENT OR EUTECTIC

14    FREEZE DRYING SOLVENT

16    REMOVE DRYING SOLVENT

| | |
|---|---|
| 10 | PREPARARE WET GEL |
| 12 | SOLVENT EXCHANGE WITH NON-POLAR SOLVENT OR EUTECTIC |
| 14 | FREEZE DRYING SOLVENT |
| 16 | REMOVE DRYING SOLVENT |

FABRICATION OF AEROGELS AND AEROGEL COMPOSITES BY AMBIENT PRESSURE SUBLIMATION OF FROZEN SOLVENTS

CROSS-REFERENCE TO RELATED APPLICATIONS

This application claims priority to U.S. Ser. No. 62/868,228 filed Jun. 28, 2019, and the complete contents thereof is herein incorporated by reference.

This invention was made with government support under Grant Numbers DE-AR000736 and DE-EE0008223 awarded by the Department of Energy (DOE) and 693JK3-20-C-000007 awarded by the Department of Transportation (DOT). The government has certain rights in the invention.

FIELD OF THE INVENTION

This invention is directed to a manufacturing process for drying aerogels in a cost effective manner and without excessive cracking or shrinking.

BACKGROUND

Aerogels and aerogel composites are excellent thermal insulators. Their processing, however, is difficult and expensive. The processing issues increase cost and make upscaling quite challenging. As a result, aerogels are mostly confined to niche applications.

Among the processing issues, the ability to dry the aerogel represents a significant hurdle. Aerogels are synthesized by reacting precursors in a solvent. Before drying, they comprise a skeleton of nanoparticles with pores filled by the solvent used for the synthesis. This solvent, which is typically a common organic solvent, such as methanol, ethanol, or acetonitrile, is referred to herein as a "gelation solvent". Because of capillary forces, the gelation solvent cannot be evaporated in ambient temperature and pressure conditions without inducing cracks in the aerogels monolith. For example, a process commercialized by Cabot, Inc., which is based on ambient evaporation, yields granules with a size of a few millimeters.

Aerogels monoliths are typically obtained by supercritical drying. For this, the gelation solvent is either brought to its supercritical conditions, or is exchanged with another solvent (e.g., liquid $CO_2$) which is then brought to the supercritical point. Supercritical fluids have negligible surface energy. Therefore, their evaporation does not cause capillary stresses, and yields monolithic aerogels. The issue with supercritical drying is that most liquids reach supercritical conditions at high pressures, and sometimes at high temperatures. For example, $CO_2$, the most commonly employed supercritical drying fluid, has a supercritical pressure $P_c$ close to 74 bar. Common organic solvents, such as methanol, ethanol and acetone, have $P_c$ in the 50-70 atm range (and a critical temperature >200° C., which further complicate matters). The high pressures of supercritical fluids require the use autoclaves with thick walls (to withstand high pressure conditions and also high temperatures). These autoclaves are not very practical to use, e.g., many are of a size which restricts the size and shape of an aerogel that can be produced, and the operating this equipment in a safe and effective manner requires significant training. Most importantly, autoclaves are extremely expensive, which, in turn, increases costs for aerogels being produced. Thus, in many applications, the high capital expenditures make aerogels not cost-competitive.

An alternative to supercritical drying is freeze drying. In freeze drying, the solvent is frozen and sublimated under vacuum. Examples of freeze-drying of aerogels are described in U.S. Patent Publication 2019/0143390 to Bertino and U.S. Patent Publication 2019/0233607 to Bertino, both of which are herein incorporated by reference. Compared to supercritical drying, freeze drying lowers capital expenditures: vacuum chambers are much easier and less costly to build than high pressure autoclaves. Yet, freeze drying alleviates but does not really solve the issues of capital expenditures.

Methods are required which are capable of yielding aerogels in monolithic form by ambient drying. An example of a technique which can achieve drying in ambient conditions is described in U.S. Patent Publication 2019/0062517 to Steiner and WO 2020/0069023 to Steiner, both of which are herein incorporated by reference. The Steiner references describe how to prepare aerogels by evaporating frozen tert-butanol at ambient conditions. In brief, the authors prepare a wet gel (that is, an aerogel, but with the solvent still inside the pores) by using standard synthetic techniques. Such a gel, if supercritically dried, would yield an aerogel. If the solvent were evaporated from the liquid phase, a cracked, heavily shrunk monolith with reduced porosity would result. To prevent solvent evaporation from the liquid phase, Steiner describes exchanging the gelation solvent with tert-butanol. Tert-butanol is an alcohol with a high melting point around room temperature (24.8° C.). After exchange, the sample is cooled and tert-butanol is frozen. Until this step, the procedure used by Steiner is very close to that described in early work on freeze drying of aerogels described in Egeberg "Freeze drying of silica gels prepared from siliciumethoxide" *Journal de Physique Colloques* (1989) 50(C4), p. C4-23-34-28, and is neither novel nor surprising. The difference with Egeberg is that tert-butanol is evaporated by Steiner in ambient conditions. The monoliths are placed inside an enclosure and are dried by passing a flow of dry air or dry nitrogen, or by applying mild vacuum. Steiner et al. claim that their procedure yields aerogels and aerogel composites with properties comparable to those of aerogels supercritically dried.

While the Steiner technology appears promising, in tests conducted by our group on polymeric aerogels (polyurea, polyisocyanurate and resorcinol-formaldehyde), it was noticed that exchange of the gelation solvent (acetonitrile) with tert-butanol induced a linear shrinkage of the wet gel by up to 20%, even before drying. Worse yet, gels also shrank and tended to crack during drying. Shrinkage of polymeric aerogels is a well-documented phenomenon, which is commonly reported in specialized literature. Shrinkage is attributed to the formation of hydrogen bonds between polymer strands. Shrinkage is unavoidable in polymeric aerogels, but it must be minimized because it compromises their thermal insulation. Shrinkage reduces pore volume and pore diameter, and it also increases the density of aerogels. The combination of these effects increases thermal conductivity.

In aerogels, thermal conductivity is due for the most part to heat transport through the air, but also through the solid skeleton. Transport through the air in the pores is sluggish in aerogels because their small pore size inhibits convection (this has been referred to as the "Knudsen effect"). Reduction of the pore size by shrinkage does not reduce convection since aerogel pores are very small to begin with. However, reduction of pore volume by shrinkage reduces the number of pores, and increases the solid phase. Therefore, conduction through the solid phase becomes more relevant. The considerable shrinkage observed during solvent exchange with tert-butanol is of great concern, since additional shrinkage would be expected (and was, in fact, measured) after drying.

Alternative and improved drying techniques are needed which will enable product of aerogels with drying performed at ambient temperature and pressure conditions.

SUMMARY

An aspect of the invention is to provide a drying process for aerogels which can be performed under ambient temperature and pressure conditions using a solvent that does not form hydrogen bonds with pore walls of the wet gel or aerogel.

Yet another aspect of the invention is to provide a drying process for aerogels which can be performed under ambient temperature and pressure conditions using a non-polar solvent.

Another aspect of the invention is to provide a drying process for aerogels which utilizes eutectics or solvent mixtures in the drying process.

According to the invention, the process for aerogel formation with ambient drying contemplates preparation of a wet gel using any of a variety of standard recipes; then exchanging the gelation solvent of the wet gel with the drying solvent; then freezing the drying solvent to produce a gel with frozen drying solvent; then removing the frozen dry solvent from the gel by exposing it to a vacuum, dry air, or dry inert gas(es).

DETAILED DESCRIPTION

Figures 1, 2:
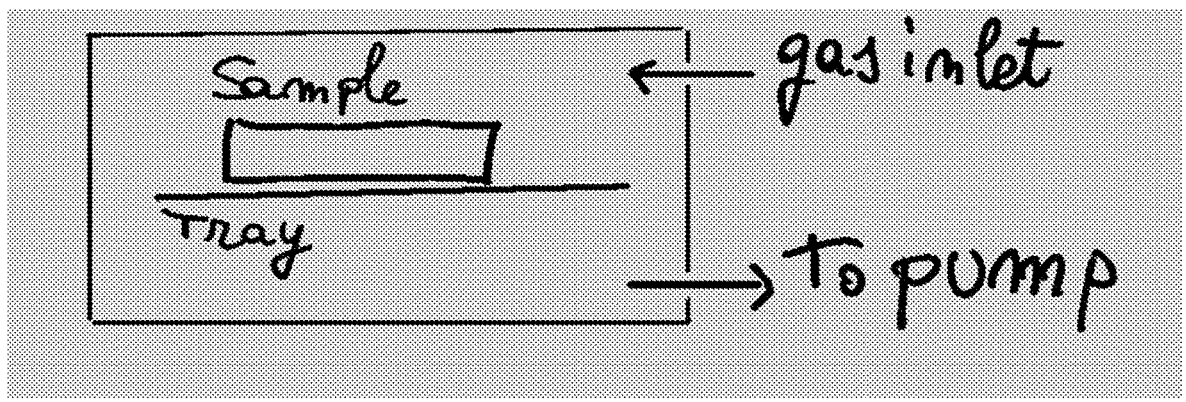
FIG. 1 is a schematic diagram illustrating an example of the drying process of the present invention.
FIG. 2 is a schematic diagram showing an enclosure for drying an aerogel.

As noted above, the Steiner technology was carefully evaluated. Drying was carried out be freeze drying or by ambient drying from frozen tert-butanol as reported by Steiner. Independent of the drying method, drying from tert-butanol yielded materials with inferior properties compared to those dried using solvents that did not form hydrogen bonds with the pore walls, such as several non-polar solvents. To understand where shrinkage attributable to tert-butanol comes from, we prepared a series of wet organic gels using the procedures of Czlonka, *J. Sol-Gel Sci. Technolog.* 93:149-167 (2020). We then exchanged the gelation solvent (acetonitrile) with tert-butanol and with non-polar solvents that do not form hydrogen bonds with the pore walls, such as cyclohexane, benzene and camphene. Shrinkage was on the order of 20% with tert-butanol and typically 7-9% when non-polar solvents were employed, indicating that the observed shrinkage was due to formation of hydrogen bonds between tert-butanol and the pore walls. Freeze drying of organic aerogels in tert-butanol and cyclohexane was also compared. Freezing from tert-butanol yielded heavily shrunk (>50%), cracked monoliths. No cracks were noticed, instead, when cyclohexane was used as a drying solvent. Another example is reported in Example 4 below.

Based on these results, a systematic investigation of non-polar solvents that do not form hydrogen bonds with pore walls of the wet gel or aerogel and solidify at or around room temperature and have a vapor pressure sufficiently high to allow for high sublimation rates was performed. Examples of these solvents are camphene, cyclohexane, benzene, naphthalene, and camphor, as well as mixtures of two or more of these solvents. These mixtures may or may not have an eutectic point. In general, any non-polar solvent with a pressure >0.005 bar at its melting point is likely to be a suitable solvent for practicing the described invention. Table 1 reports melting points and vapor pressures for some of these solvents at the indicated temperatures.

| Compound | Temperature (K) | Vapor pressure (bar) |
|---|---|---|
| Tert-butanol | 313 | 0.137 |
| Camphene | 320 | 0.013 |
| Naphthalene | 353 | 0.01 |
| Camphor | 451 | 0.48 |
| Cyclohexane | 293 | 0.102 |
| Benzene | 287 | 0.07 |

1. Table 1 Vapor pressures of solvents that can be used in our process, near their melting points. From NIST Chemistry Web book (webbook.nist.gov/chemistry/).

Based on experimental results with various solvents or solvent mixtures different from those described in Steiner, FIG. 1 shows an exemplary process for achieving drying of aerogels under ambient conditions (a pressure ranging from 100 Torr to 760 Torr) using non-polar solvents that do not form hydrogen bonds with the pore walls. In the processes, the temperature may range from −50° C. to 180° C.

In step 10, a wet gel is prepared. The wet gel can be polymeric (for example, the wet gel may include a polyurea, a polyisocyanate, a polyisocyanurate, a polyimide, a polyamide, a polyaramid, or a polyurethane) or an oxide wet gel. The wet gel may also include fillers (e.g., ceramic particles, plastic particles or fibers, wood particles or fibers, wood flour, etc.).

The manner of producing a wet gel is well understood and can be accomplished by a variety of recipes. As an example for producing a native aerogel, a generalized methodology would include: (a) providing a first solution comprising an alkoxide; (b) providing a second solution comprising a catalyst; (c) mixing the first and second solutions to provide a gelation mixture; (d) optionally pouring the solutions (or gelation mixture) into a mold. Either or both the first and second solution may include surfactants. Mixing of the first and second solutions results in formation of a wet gel as a result of hydrolysis of the alkoxide and condensation of the hydrolyzed alkoxide.

The gelation mixture or composition (i.e., wet gel) may comprise a ratio of alkoxide to solvent (whether it is water, organic solvent, or a mixture of water and organic solvent) at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. The gelation mixture may comprise a ratio of catalyst to solvent at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. Likewise, the ratio of catalyst to alkoxide may be around 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, 1:2, 2:1, 1:3, 3:1, 1:4, 4:1, 1:5, 5:1, 1:6, 6:1, 1:10 or 10:1 and so on, or any range within these ratio ranges. Such ratios may be determined by weight or by volume.

In some embodiments of the method, porous matrices are synthesized through a modification of hydrolysis condensation of alkoxides in which addition of water is reduced, or minimized. The reaction occurs in an organic solvent and water with a concentration of water of approximately 4.4% v/v or lower, such as an ethanol-water azeotrope mixture (as used in this specification, references to "ethanol" are intended to mean an ethanol-water azeotrope mixture); the water in the azeotrope slowly hydrolyzes the alkoxide. Lower water concentrations can also be employed but they usually increase gelation time. In embodiments, water can be present in the gelation solution in an amount ranging from about 0.05% v/v to about 5% v/v, such as from 0.1% v/v to 4% v/v, or from about 0.2% v/v to 3% v/v, or from 0.3% v/v to 2% v/v, or from 0.4% v/v to 1.5% v/v, or from about 0.5% v/v to 1% v/v, or from about 0.6% v/v to 0.8% v/v. Water can also be provided by adding to the gelation solution hydrated metal salts. Instead of water, a compound that reacts with the alkoxide or dissociates at high temperature and liberates water could be used, such as formic acid. In embodiments, any mixture of water and an organic solvent can be used. For example, a mixture of acetone and water, or alcohol and water, or methanol and water, or butanol and water, or propanol and water can be used.

For example, in one embodiment of the method, porous matrices are synthesized by hydrolyzing an alkoxide without adding any water beyond that present in the ethanol-water azeotrope. First tetramethyl orthosilicate (TMOS) or polyethoxydisiloxane (PEDS) is dissolved into ethanol. Separately, a second solution is prepared which contains ethanol and an amine such as triethanolamine. The two solutions are then mixed and poured into a mold and a gel forms typically within about an hour.

In some embodiments, the first and second solutions are combined to provide a gelation mixture or composition and the alkoxide is present in an amount ranging from about 0.1% v/v to 50% v/v based on total volume of the composition, and/or the composition comprises an amine present in an amount ranging from about 0.1% v/v to 20% v/v based on total volume of the gelation mixture, and/or the composition comprises an organic solvent present in an amount ranging from about 20% v/v to 90% v/v based on total volume of the gelation mixture. In embodiments, the organic solvent can be present in these concentrations and can be chosen from one or more of an alcohol or a ketone, such as one or more of ethanol, methanol, butanol, propanol, acetone, or dimethylsulfoxide.

In one particular embodiment, water is used as a solvent in the composition in lieu of any organic solvent. For example, in one embodiment, native silica aerogels are prepared by combining urea, cetyl trimethylammonium bromide (CTAB), and acetic acid with water as the solvent and thoroughly mixing these reagents. Methyltrimethoxysilane is added to the solution to form a gelation composition or mixture and continually stirred for 30 minutes. This composition is then poured into a mold and placed in an oven at 60° C. for 36 hours to allow for gelation and aging.

In other embodiments, the present invention can be used when synthesizing cross-linked aerogels. In addition, embodiments of the invention allow for fabrication of custom aerogel parts with large dimensions (e.g., square parallelepeds of 1 cm to 50 cm on a side, and 3 mm to 30 mm in height). The custom aerogel parts may be used in a variety of thermal insulation applications and other applications.

This invention can be practiced during the production of cross-linked silica aerogels (mechanically strong aerogels). Their mechanical strength arises by cross-linking the skeletal oxide particles with a polymer (see U.S. Pat. Nos. 8,277,676 and 8,227,363, which are herein incorporated by reference). The strength of these materials allows them to withstand a variety of stresses (e.g., temperature, impact, etc.). Examples of these gels are described in International Patent Application Publication No. WO 2016019308 which is herein incorporated by reference. These methods comprise: a) mixing a first solution comprising an alkoxide with a second solution comprising a catalyst, an acrylic monomer, a silica derivatizer and a polymerization initiator and optionally pouring the solutions into a mold. Mixing results in the formation of a wet gel as a result of hydrolysis of the alkoxide and polymerization of the hydrolyzed alkoxide. This wet gel is then stimulated with sufficient intensity to catalyze cross-linking of the wet gel by the polymerization initiator, prior to the solvent exchange discussed below.

In an embodiment, a first solution is prepared by adding an alkoxide carrying a polymerizable moiety (such as vinyltrimethoxysilane (VMOS)) to a solution of ethanol and TMOS. A second solution is prepared separately which contains ethanol, triethanolamine, a polymerization initiator and a monomer such as methylacrylate. The solutions are then mixed and a gel is synthesized by mixing the two solutions.

According to an exemplary embodiment, cross-linked aerogels are fabricated by combining an alkoxide carrying a polymerizable moiety, e.g. vinyltrimethoxysilane (VMOS) or tetramethylorthosilane (TMOS), added to a primary, secondary or tertiary alcohol. A second solution is prepared separately which includes the same or another alcohol, a catalyst such as triethanolamine, a monomer such as methylmethacrylate, a silica derivatizer such as trimethoxysilylpropyl methacrylate and a polymerization initiator. If dry solvents are employed, water can be added to reach a concentration of no more than 4-5% by volume of the solvent. The two solutions are then mixed and poured into a mold. Gelation occurs within one hour. Next, polymerization is initiated thermally if a thermal initiator is employed, or by photopolymerization when a photoinitiator is used. After polymerization, solvent exchange is performed as described below, In step 12, exchange of the gelation solvent is performed.

Solvent exchange might be easily performed by submerging the wet gel in a container with excess drying or other solvent, and waiting for equilibration. Other methodologies of solvent exchange will be well understood by those of skill in the art. Equilibration depends on the size of solvents (gelation and exchange solvent), pore size and part size. For a solvent like tert-butanol and acetonitrile in silica gels 3 mm thick, the equilibration time will be about two hours. However, the equilibration time may be as long as two days for thicker parts. The solvent exchange may be enhanced by application of pressure (positive or vacuum).

If the gelation solvent is polar, contains water, or is otherwise not miscible with the drying solvent, the process can be performed by first using an exchange solvent where both gelation solvents and drying solvents are soluble. For example, if the gelation solvent is ethanol and the drying solvent is camphene, one might first use acetonitrile or toluene as the exchange solvent with the ethanol gelation solvent, and second use the camphene to exchange with the acetonitrile or toluene solvent after the first step.

Alternatively, if both the gelation solvent and the drying solvent are nonpolar, the exchange may be performed in a single step.

If the drying solvent melts at temperature above ambient (e.g., 25° C. to 200° C.), the wet gel must be kept at temperatures above the melting point of the drying solvent during the exchange step 12.

During solvent exchange 12, the wet gel and the solvents should be in a container that is leak tight and prevents solvent from evaporation.

The wet gel may be removed from the mold into which the liquid precursors are poured in step 10, or the wet gel can be kept inside the mold with both steps 10 and 12 being performed in the same vessel.

The exchange process 12 terminates when the purity of the solvent inside the pores is within 1% of the purity of the drying solvent. However, a higher degree of impurities can be accepted if it does not compromise the pore structure and does not cause cracking. A reasonable upper limit appears to be 10%. By purity we mean that at the termination of the exchange process the solvent in the pores of the wet gel is 90-99% more the same as the dry solvent prior to exposure to the wet gel.

In step 14, the drying solvent in the wet gel is brought below its freezing point. The solvent may be de-aerated prior to cooling, even though this has not exhibited any influence on drying. In many or all cases, the freezing rate appears to be irrelevant. For example, freezing of drying solvents has been achieved by placement of samples in a refrigerator kept at 4° C., placement of sampled in a freezer at −20° C., placement of the sample in a container cooled by precooled ethanol, and simply leaving the sample at room temperature (in cases where the drying solvent has a melting temperature above room temperature).

Once frozen, the drying solvent can be removed (step 16) at ambient conditions by using standard procedures and machinery. For example, machinery used to dry fruits and other food stuff can be utilized for removal of the frozen drying solvent. In some embodiments, one could place the gel with frozen dying solvent inside a vacuum chamber, a food dryer, a drying oven, or a vacuum oven, and blow nitrogen or dry air on the samples. It is important to use dry air or nitrogen or other inert gases (e.g., Argon) for the drying process. Exposure to moisture will result in partial melting of the solvent. This would lead to having the drying solvent evaporating from the liquid phase and the ensuing capillary forces will cause cracking, shrinking and pore collapse (exactly what the process is designed to avoid). In the practice of the invention, the frozen drying solvent is removed through sublimation, not evaporation from a liquid.

Among other things, the choice of the drying solvent differentiates the process from prior processes for aerogel formation. While many solvents can be used for the process, benzene and cyclohexane may not be ideal in some applications. These solvents melt below room temperature. Therefore, the sample must be placed in a refrigerator. Worse, the melting point of fluids in porous systems decreases when pores are small. This Gibbs-Thomson effect can lead to a depression of the melting point by several degrees, forcing one to keep the sample refrigerated during the whole process. Refrigeration would complicate the drying set up and also increase energy costs.

Exemplary drying solvents include but are not limited to camphene, naphthalene, camphor, menthol, camphor oxime, anthracene, dichlorobenzene, eucalyptol, benzene, cyclohexane, limonene, taxadiene, humulene, squalene, terpenes, diterpenes, triterpenes, terpenoids, diterpenoids, triterpenoids (e.g., cholesterol), fenchene, myrcene, carvone, chloronaphthalene, chloroanthracene, etc., and mixtures thereof.

The preferred requirement of the drying solvent for the practice of the present invention is that it be generally non-polar, not forming hydrogen bonds with the pore walls, and have a freezing point near an ambient temperature between 10° C.-25° C., and higher (e.g., 10° C. to 200° C.), and a vapor pressure near ambient pressure between 0.005 Torr and 10 Torr.

Using eutectics or solvent mixtures to decrease melting points can help save costs. For example, camphor costs about 50% less than camphene and naphthalene. However, camphor melts at 180° C. This high melting temperature is impractical for solvent exchange, since most organic solvents (including most solvents used for gelation) boil well below the melting point of camphor. However, mixtures (e.g., 50% by volume) of naphthalene and camphor have an eutectic with a melting point of 31° C. Therefore, this mixture would allow an aerogel producer to replace 50% of naphthalene with the less expensive camphor. Eutectics may include 10-90% by volume of the drying solvent, and 90-10% of another solvent (e.g., camphor). The melting point of camphor and camphene scales nearly linearly with camphene content, therefore this mixture is not as advantageous as the naphthalene-camphor eutectic.

The aerogels which can be formed by the aforementioned processes are wide ranging. Aerogels are dry, nanoporous, nanostructured materials that exhibit a diverse array of extreme and valuable material properties, e.g., low density, ultralow thermal conductivity, high density-normalized strength and stiffness, and high specific internal surface area, amongst others. Nanoporous refers to porous materials in which the pores are primarily nanopores, that is, pores with widths less than 1 micron. The term aerogel may refer to a substance having a certain material composition that exhibits a particular geometry. Suitable aerogel material compositions may include, for example, silica, metal and metalloid oxides, metal chalcogenides, metals and metalloids, organic polymers, biopolymers, amorphous carbon, graphitic carbon, diamond, and discrete nanoscale objects such as carbon nanotubes, boron nitride nanotubes, viruses, semiconducting quantum dots, graphene, or combinations thereof. Metalloids may include boron, silicon, germanium, arsenic, antimony, tellurium, and polonium. Metals may include lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, thorium, protactinium, uranium, neptunium, plutonium, americium, curium, berkelium, californium, einsteinium, fermium, mendelevium, nobelium, lawrencium, and the transactinide metals.

Additionally, a number of aerogel nanocomposite configurations may be prepared, for instance, materials that integrate organic polymers and silica into a single network (e.g., ormosils, organically modified silica/silicate materials, etc.), materials in which two or more separate networks of different composition are interpenetrating (e.g., a metal oxide network interpenetrated with a resorcinol-formaldehyde polymer network, a metal or metalloid oxide network interpenetrated with a polyurea network), core-shell nanocomposites in which a polymer conformally coats the interior contour surfaces of an oxide network (e.g., x-aerogels, cross-linked aerogels, etc.), aerogels in which nanoparticles of a varying composition are dispersed (e.g., metal-nanoparticle-doped carbon aerogels, gold-nanoparticle-doped silica aerogels), and more. As provided herein, aerogel materials may be considered as any solid-phase material that is primarily mesoporous (i.e., contains pores between 2-50 nm in diameter), comprising at least a 50% void space by volume in which the solid-phase component comprises a 3D nanostructured solid network. Accordingly, any material that meets this description may be considered as an aerogel material.

A number of potential applications of aerogel materials involve the materials being in monolithic or panel form, for example, as opposed to particles, powders, or fiber-reinforced blankets. As mentioned above, manufacturing of aerogel monoliths/panels with dimensions large enough to be useful for various applications (e.g., applications in aviation, automotive, marine, construction, etc.) using supercritical drying is often cumbersome and expensive, in large part, due to the following requirements: 1) large, expensive, specialized equipment, 2) size-limited throughput-stifling batch processes, and 3) copious amounts of carbon dioxide and/or flammable solvents and energy. In fact, monoliths with lengths and widths greater than about 1 m×4 m of many aerogel materials, particularly aerogels with bulk densities ranging from 0.05 g/cc to 0.3 g/cc, have not previously been possible to manufacture due to the unavailability of supercritical dryers large enough to accommodate manufacturing of such parts and the extreme costs associated with supercritically drying such large monoliths. Making large aerogel monoliths can be further complicated by shrinkage of the gel part during. Production of large aerogel monoliths also frequently requires a mold, as the wet gel may not be strong enough to support its own weight or may be too cumbersome to practically handle until after it is dry. The present invention solves these problems by eliminating the need for supercritical drying equipment.

In addition, when a gel is subjected to a drying process that involves significant shrinkage of the gel due to the drying process, the shrinkage may also be coupled to restriction of the gel part to the mold, which may result in significant cracking, warping, tapering, and other distortion of the final aerogel part. In some embodiments of the present disclosure, drying of aerogels monoliths may be performed without shrinkage that would damage the gel as it is dried. This invention solves the shrinkage which can occur with solvent exchange with polar solvents. Non-polar solvents are preferable because they do not form hydrogen bonds with the pore walls. Furthermore, the embodiments of the invention contemplate the use of eutectics or solvent mixtures. These can be helpful to reduce the melting point and to save costs on the solvent exchange operation.

Thus, the invention may be performed at ambient pressures, enabling drying of very large aerogel monoliths, e.g., greater than about 1 m×4 m, while preventing cracking, warping, tapering, and other distortion of the very large aerogel monolith. Monoliths may be stiff or flexible. For example, traditional fiber-reinforced aerogel blankets, such as fiber-reinforced silica aerogel blankets manufactured by Aspen Aerogels, are not considered monolithic because they are a composite of aerogel material and fiber and the aerogel material throughout is highly fractured and pulverized and depends on the fiber reinforcement to be held together as a macroscopic article. However, monoliths that are flexible, such as some polyimide aerogels, may be produced. Fiber-reinforced monoliths may be produced as well, for example, a flexible polyimide aerogel that is reinforced with fibrous batting, or a non-flexible polyurea aerogel panel that is reinforced by aligned fibers. A stiff monolith may be distinguished from a flexible monolith in that a flexible monolith may be bent within the elastic deformation regime and exhibit a radius of curvature of about 0-1 mm, about 0-10 mm, about 0-25 mm, about 0-50 mm, or about 0-100 mm, while a stiff monolith when bent within the elastic deformation regime may exhibit a radius of curvature of greater than about 100 mm, or remain substantially flat.

Example 1

In 20 mL of ACS-grade acetonitrile, 2.21 g of resorcinol are added under vigorous magnetic stirring. After dissolution, 10 mL of aqueous formaldehyde solution (37% formaldehyde by weight) are added, together with 250 µL of 3-[2-(2-Aminoethylamino)ethylamino]propyl-trimethoxysilane (catalyst; CAS 35141-30-1), 0.055 g of graphene oxide and 1.22 of cellulose. The solution is then poured into a teflon (or polypropylene, or metal) mould, where it gels within 15 minutes at room temperature. After gelation, the gel can be removed from the mould and placed into a leak-tight container. Alternatively, mould and gel can be placed into the container. The container can be metallic, or made of a plastic that is not attacked by the organic solvents used for processing (e.g., polypropylene).

The gelation solvent is then exchanged first with toluene, and then with camphene. Toluene exchange is necessary because water (from the formaldehyde solution) and camphene are not miscible. Hence the toluene intermediate step. This intermediate step could be avoided by adding molecular sieves to liquid camphene. Water would be adsorbed by the sieves, allowing for penetration of the camphene into the gel pores.

To exchange with toluene, the container with the wet gel is filled with excess solvent (typically 10× the volume of the gel). After 4 hours, the solvent is removed from the container and is replaced with fresh solvent. This operation is repeated a minimum of three times. Camphene exchange follows the same scheme, but the container is kept at a temperature >50° C. to prevent solidification of camphene.

After solvent exchange camphene is frozen by letting the container cool at room temperature. Freezing can be accelerated by placing the container with the sample in a refrigerator or a freezer. However, in our experience the cooling rate does not appear to affect the properties of the dried aerogel.

Once camphene is solid, the sample is placed inside a vacuum chamber with an inlet for nitrogen (or dry air), and an outlet to which a vacuum pump may be attached, as shown in FIG. 2. Camphene is heavier than air or nitrogen, therefore the outlet must be placed below the inlet and below the sample, as in FIG. 2. Similarly, the sample should not be placed into a container with lips, such as a Petri dish. The heavy camphene could accumulate at the bottom of the dish and slow down sublimation. A recommended drying arrangement includes placement of the sample over a mesh, suspended over a flat tray. Holes may be drilled into the tray, or the tray can be a mesh itself, to facilitate solvent removal. Nitrogen can be passed continuously over the samples. Alternatively, the gas inlet can be closed and the chamber pumped to about 100 Torr by a vacuum pump, and kept at under this mild vacuum to accelerate evaporation. Alternatively, the vacuum chamber can be filled with nitrogen or dry air a few minutes after evaporation. This process of evacuation-filling is repeated in 15 minutes intervals, and it can be controlled by times attached to electromechanical valves.

Other drying arrangements are possible. For example, one could use a vacuum oven and pump-fill it in the same way as described in FIG. 2, or a food dryer.

Independent of the drying set up, it is important to prevent moisture from entering the drying chamber. We have noticed that the melting point of camphene is depressed if the solvent comes in contact with even minute amounts of water. The depression is sufficient to melt the solvent at room temperature, with negative effects on the dried material Using the set-up described in FIG. 2, drying is complete within 24 hours for a 3 mm thick sample. Drying times increase with thickness. To accelerate drying, excess camphene used for the solvent exchanges may be removed from the container prior to freezing. Alternatively, excess camphene can be cut away from the sample using a razor blade after freezing. The sample can also be placed on a metal sieve or mesh, and the mesh suspended above the shelf of the dryer, to allow for sublimation from the lower surface of the sample.

Aerogels prepared with this procedure are monolithic, with a density of 0.277 $g/cm^3$.

Example 2

In 100 mL of acetonitrile, 10 g of resorcinol are added and dissolved under vigorous magnetic stirring. After dissolution, 50 mL of formaldehyde (37%) and 2 mL of 3-[2-(2-Aminoethylamino)ethylamino]propyl-trimethoxysilane (catalyst; CAS 35141-30-1) are added. The solution is poured into a mould and gelation occur within 15 minutes at room temperature. The remainder of the processing is as in Example 1. The resulting aerogel monolith has a density of 0.22 $g/cm^3$ and a surface area of 144 $m^2/g$.

Example 3

To 15 mL of ethanol-water azeotrope mixture, 3.23 g of resorcinol are added and dissolved under vigorous magnetic stirring. After dissolution, 10 mL of formaldehyde are added, and 0.5 mL of amino propyl trimethoxysilane (catalyst) are added. Gelation occurs within 15 minutes. The remainder of the processing is as in Example 1. The resulting aerogel monolith has a density of 0.20 $g/cm^3$ and a surface area of 134 $m^2/g$.

Example 4

This example shows how camphene and, in general, solvents that do not form hydrogen bonds with the pore walls, are superior to tert-butanol.

In 15 mL of ACS-grade acetonitrile, 2.25 g of resorcinol are added under vigorous magnetic stirring. After dissolution, 5 mL of aqueous formaldehyde solution (37% formaldehyde by weight) are added, together with 250 µL of amino propyl-trimethoxysilane (catalyst). The solutions is then poured into a teflon mold with a diameter of 50 mm where it gels with 15 min. at room temperature. After gelation, the gel (which has a height of approximately 10 mm) is removed from the mold and placed into a leak-tight container. Four gels were prepared using the formulation. The gelation solvent was exchanged with tert-butanol for the first two samples (samples 1-2), with cyclohexane for sample 3, and with camphene for sample 4. Solvent exchange is described in Examples 1-3. Solvent exchange induces linear shrinkage of the wet gels. However, samples 1-2 (tert-butanol) present a linear shrinkage by about 20%. Samples 3-4 shrink by 5% at the most. Solvents were frozen by placing the samples in a refrigerator kept at 4° C. Samples 1 (tert-butanol) and 3 (cyclohexane) were freeze dried using a commercial freeze dryer (SP scientific, Genesis). Sample 1 further shrank and cracked. Sample 3, instead, remained monolithic and exhibited a density of approximately 0.25 $g/cm^3$. Samples 2 (tert-butanol) and 4 (camphene) were dried using the apparatus of FIG. 2. Because of the higher melting point of tert-butanol (as compared to camphene) the chamber was kept at 12° C. Sample 4 (camphene) remained monolithic while sample 1 (tert-butanol) shrank and cracked. Samples could only be dried out of tert-butanol which had higher amounts of resorcinol (4.137 g instead of 2.25 g) and formaldehyde (10 mL instead of 5 mL). Even with these higher concentrations, the gels shrank. The density of these (tert-butanol) gels dried in ambient was of 0.337 g and the surface area was around 10 $m^2/g$, indicating pore collapse and densification during drying.

Example 5

The following is an example of oxide aerogel that can produced according to embodiments of the claimed invention.

Solution A is prepared by mixing 0.350 ml TMOS, and 0.31 mL acetonitrile and 0.105 mL $H_2O$. Solution B is prepared by mixing 0.067 ml aminopropyltrimethoxysilane or aminopropyltriethoxysilane and 0.31 ml Acetonitrile. The solutions are mixed and rapidly poured into a mould. Gelation occurs within 1 minute. After gelation, the sample is be placed in a leak-tight container filled with excess acetonitrile at a 5:1 ratio and set in an oven for four hours at 70° C. The acetonitrile can then be exchanged for fresh acetonitrile at a 5:1 ratio, and then again after 3 hours. The solvent is then exchanged with a solution of an isocyanate (such as di-isocyanate or tri-isocyanate) in acetonitrile. A typical solution comprises 0.560 g di-isocyanate in 10 ml acetonitrile, however, other proportions are also possible. After an exchange for 24 hours, the sample can be placed in a 5:1 excess acetonitrile and placed in an oven at 70° C. for 24 hours. During this time, the sample is cross-linked with di-isocyanate. After cross-linking with di-isocyanate is complete, the pore-filling acetonitrile solution is exchanged with tert-butanol or camphene following the procedure shown in Example 1. The solvent is then frozen, typically by placing it in a refrigerator kept at 4° C. Freezing velocity does not appear to play a role on the final result, nor does degassing of the solvent, or addition to a drying agent (e.g., molecular sieves, or CaO) to the solvent. The samples are then placed in the dryer shown in FIG. 2. Samples dried from camphene and typically monolithis, with a linear shrinkage <10%, density ~0.35 $g/cm^3$, a surface area of 150 $m^2/g$, a thermal conductivity of 0.04 W/mK and a modulus of compression >50 MPa. Samples dried from tert-butanol are not monolithic and shrink 10-20%, independent of processing conditions. Samples dried from camphene have been obtained that are >10 mm thick and have other linear dimensions >10 cm.

The invention claimed is:
1. A method of preparing an aerogel, comprising:
preparing a wet gel containing a gelation solvent;
exchanging the gelation solvent with a drying solvent in the wet gel, wherein the drying solvent does not form hydrogen bonds with pore walls of the wet gel or aerogel and is a solvent with a freezing point near an ambient temperature between 10° C. and 200° C., and a vapor pressure near ambient pressure between 0.005 Torr and 10 Torr;

freezing the drying solvent in the wet gel below its freezing temperature to produce a gel with frozen drying solvent; and removing frozen drying solvent from the gel by exposing the gel to a vacuum, dry air, or dry inert gases, wherein the step of removing the frozen drying solvent results in gel shrinkage of >0% and <10%.

2. The method of claim 1 wherein the exchanging step includes the steps of exchanging in the wet gel the gelation solvent with an exchange solvent in which both the gelation solvent and the drying solvent are soluble, and then exchanging in the wet gel the exchange solvent with the drying solvent.

3. The method of claim 1 wherein the exchanging step is performed in a single step of exchanging the gelation solvent with the drying solvent in the wet gel.

4. The method of claim 1 wherein the drying solvent is a eutectic.

5. The method of claim 4 wherein the eutectic includes camphor.

6. The method of claim 1, wherein the drying solvent is non-polar.

7. The method of claim 1 wherein the drying solvent is selected from the group consisting of camphene, naphthalene, camphor, menthol, camphor oxime, anthracene, dichlorobenzene, eucalyptol, benzene, cyclohexane, limonene, taxadiene, humulene, squalene, terpenes, diterpenes, triterpenes, terpenoids, diterpenoids, triterpenoids, fenchene, myrcene, carvone, chloronaphthalene, chloroanthracene, and mixtures thereof.

8. The method of claim 1 wherein the drying solvent is camphene.

9. The method of claim 1 wherein the drying solvent is naphthalene.

10. The method of claim 1, wherein the gel shrinkage is from 7-9%.

11. The method of claim 7, wherein the drying solvent is selected from the group consisting of camphor oxime, dichlorobenzene, eucalyptol, benzene, limonene, taxadiene, humulene, squalene, a terpene, a diterpene, a triterpene, a terpenoid, a diterpenoid, a triterpenoid, fenchene, myrcene, carvone, chloronaphthalene, chloroanthracene, and mixtures thereof.

12. The method of claim 7, wherein the drying solvent is fenchene.

13. The method of claim 1, wherein the aerogel is not warped after drying.

14. A method of preparing an aerogel, comprising:

preparing a wet gel containing a gelation solvent;

exchanging the gelation solvent with a drying solvent in the wet gel, wherein the drying solvent does not form hydrogen bonds with pore walls of the wet gel or aerogel and is a solvent with a freezing point near an ambient temperature between 10° C. and 200° C., and a vapor pressure near ambient pressure between 0.005 Torr and 10 Torr;

freezing the drying solvent in the wet gel below its freezing temperature to produce a gel with frozen drying solvent; and removing frozen drying solvent from the gel by exposing the gel to a vacuum, dry air, or dry inert gases, wherein at the termination of the exchanging step, solvent in the pores of the wet gel is 90-99% or more the same as the drying solvent prior to its exposure to the wet gel.

15. The method of claim 14, wherein the exchanging step is performed in a single step of exchanging the gelation solvent with the drying solvent in the wet gel wherein the step of removing the frozen drying solvent results in gel shrinkage of >0% and <10%.

16. The method of claim 14, wherein the aerogel is not warped after drying.

17. The method of claim 14, wherein the exchanging step includes the steps of exchanging in the wet gel the gelation solvent with an exchange solvent in which both the gelation solvent and the drying solvent are soluble, and then exchanging in the wet gel the exchange solvent with the drying solvent.

18. The method of claim 14 wherein the drying solvent is a eutectic that includes camphor.

19. The method of claim 14 wherein the drying solvent is selected from the group consisting of camphene, naphthalene, camphor, menthol, camphor oxime, anthracene, dichlorobenzene, eucalyptol, benzene, cyclohexane, limonene, taxadiene, humulene, squalene, terpenes, diterpenes, triterpenes, terpenoids, diterpenoids, triterpenoids, fenchene, myrcene, carvone, chloronaphthalene, chloroanthracene, and mixtures thereof.

* * * * *